US006429658B1

(12) United States Patent
Thomsen et al.

(10) Patent No.: US 6,429,658 B1
(45) Date of Patent: Aug. 6, 2002

(54) ENGINE IGNITION TIMING DEVICE

(75) Inventors: Jeffrey E. Thomsen, 320 Jupiter St., Cosmos, MN (US) 56228; Richard L. Clements, Redwood Falls, MN (US)

(73) Assignee: Jeffrey E. Thomsen, Cosmos, MN (US)

( * ) Notice: Subject to any disclaimer, the term of this patent is extended or adjusted under 35 U.S.C. 154(b) by 0 days.

(21) Appl. No.: 09/412,097

(22) Filed: Oct. 4, 1999

Related U.S. Application Data

(60) Provisional application No. 60/103,026, filed on Oct. 5, 1998, and provisional application No. 60/144,750, filed on Jul. 21, 1999.

(51) Int. Cl.[7] .............................. F02P 17/00; G01P 3/48

(52) U.S. Cl. ........................ 324/391; 324/378; 324/384; 324/393; 324/395; 324/402; 324/174

(58) Field of Search ................................. 324/378, 384, 324/391, 393, 395, 402, 174; 73/116; 123/435

(56) References Cited

U.S. PATENT DOCUMENTS

| | | | | | |
|---|---|---|---|---|---|
| 3,872,376 | A | | 3/1975 | Kalenevitch | 324/392 |
| 3,943,897 | A | * | 3/1976 | Luteran | 123/210 |
| 4,039,931 | A | | 8/1977 | Schweizer | 324/392 |
| 4,109,630 | A | * | 8/1978 | Richeson, Jr. et al. | 123/615 |
| 4,315,487 | A | * | 2/1982 | Wyatt, Sr. et al. | 123/146.5 |
| 4,354,378 | A | | 10/1982 | Oshiage et al. | 73/35.09 |
| 4,377,140 | A | | 3/1983 | Latsch | 123/406.26 |
| 4,493,409 | A | * | 1/1985 | Steeg | 192/115 |
| 4,573,438 | A | | 3/1986 | Whitfield | 123/146.5 A |
| 4,575,865 | A | | 3/1986 | Dackow | 377/20 |
| 4,578,755 | A | | 3/1986 | Quinn et al. | 701/99 |
| 4,635,776 | A | * | 1/1987 | Billet et al. | 192/70.27 |
| 4,791,900 | A | | 12/1988 | Buck et al. | 123/359 |
| 4,930,371 | A | | 6/1990 | Schneider | 74/527 |
| 5,014,676 | A | | 5/1991 | Boyer | 123/637 |
| 5,088,464 | A | * | 2/1992 | Meaney | 123/406.4 |
| 5,174,263 | A | * | 12/1992 | Meaney | 123/480 |
| 5,198,763 | A | | 3/1993 | Konishi | 324/207.23 |
| 5,430,370 | A | | 7/1995 | Rooke | 324/207.12 |
| 5,431,134 | A | * | 7/1995 | Budde et al. | 123/146.5 |
| 5,446,375 | A | | 8/1995 | Perkins | 324/163 |
| 5,507,089 | A | * | 4/1996 | Dickmeyer | 29/605 |
| 5,814,723 | A | * | 9/1998 | Berardinelli | 73/116 |
| 5,998,988 | A | * | 12/1999 | Dickmeyer et al. | 324/174 |

OTHER PUBLICATIONS

Haynes Automotive Repair Manual #867 for a Pontiac Firebird 1982 thru 1992, pp. 55–56. Copyright 1993.

* cited by examiner

*Primary Examiner*—N. Le
*Assistant Examiner*—Wasseem H. Hamdan
(74) *Attorney, Agent, or Firm*—Westman, Champlin & Kelly, P.A.; S. Koehler

(57) ABSTRACT

An ignition timing device for timing an engine having a timing port includes a sensor securable in the timing port to provide a timing mark signal. An ignition sensor is adapted to provide an ignition signal. A comparator receives the timing mark signal and the ignition signal. The comparator provides an output signal indicative of substantial simultaneous occurrence of timing mark signal and the ignition signal. An indicator receives the output signal and is operable as a function thereof.

11 Claims, 9 Drawing Sheets

Fig. 4
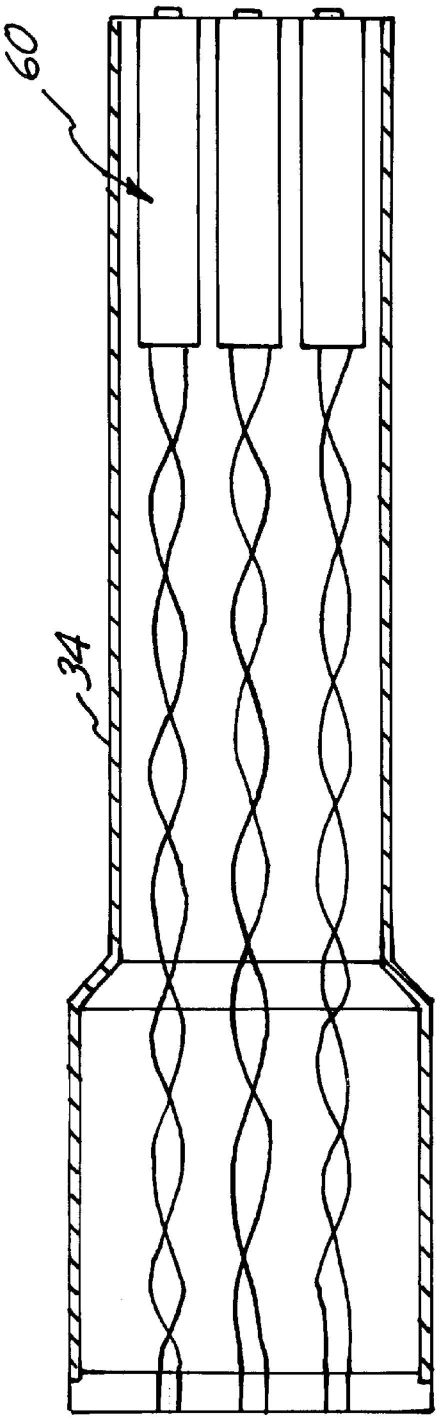
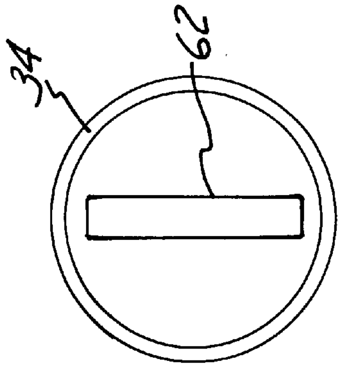
Fig. 6
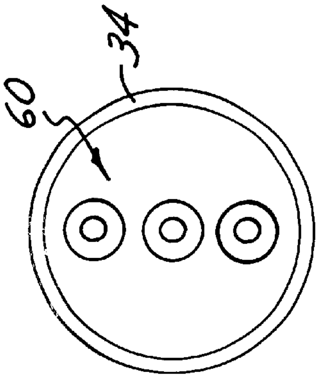
Fig. 5

ENGINE IGNITION TIMING DEVICE

CROSS-REFERENCE TO RELATED APPLICATION

This application claims priority of U.S. patent application Ser. No. 60/103,026, filed Oct. 5, 1998, and Ser. No. 60/144,750, filed Jul. 21, 1999, both of which are herein incorporated by reference in their entirety.

BACKGROUND OF THE INVENTION

The present invention relates generally to an ignition timing device. More particularly, the present invention relates to an ignition timing device for use on Harley-Davidson™ engines.

As is well known, the ignition spark used for detonation in an internal combustion engine must be timed to the position of a piston reciprocating within the combustion chamber. In order to time the engine, the manufacturer generally provides a timing mark that rotates while the engine is running. A timing light monitors the ignition system and provides a strobed light that corresponds with the firing of a particular spark plug. When illuminated by the timing light, the mark appears substantially stationary with respect to a fixed reference. The mechanic adjusts the ignition system to position the timing mark at a desired location with respect to the fixed reference. This procedure thereby adjusts the timing of the ignition spark relative to the position of the reciprocating piston.

Some internal combustion engines are particularly troublesome to time. A Harley-Davidson™ engine is known for its difficulty. To time the Harley-Davidson™ engine, the mechanic removes a timing plug of a timing port in the crankcase to expose a flywheel. The timing mark is located on the flywheel and can be seen through the timing port. The mechanic points a timing light into the timing port and notes the position of the timing mark as strobed by the timing light. Unfortunately, removal of the timing plug and operation of the engine causes an oil mist to emerge from the timing port. The emerging oil makes the timing mark difficult to see as well as typically covers the mechanic and the surrounding area with oil.

One prior art technique for controlling the oil mist includes inserting a clear plastic plug into the timing port. The clear plastic plug is supposed to block the oil mist and allow visibility of the timing mark. However, the inside surface of the plug is substantially covered with oil, which obscures visibility of the timing mark.

Other devices have been proposed for timing the Harley-Davidson™ engine. For instance, U.S. Pat. No. 5,814,723 issued to Berardinelli uses a light transmissive channel that couples light from the timing light into the timing port, while a second light transmissive channel carries light reflected from the timing mark out of the engine case. Although this device may allow easier visibility of the timing mark, one shortcoming includes the fact that the timing port is located on one side of the engine and the ignition adjustment is located on the other. Therefore, a mechanic operating by himself would find viewing the timing mark and adjusting the engine still to be difficult.

Other U.S. Patents disclose yet further devices for timing the Harley-Davidson™ engine. U.S. Pat. No. 5,431,134 discloses a Harley-Davidson™ engine ignition timing device which electronically determines top dead center (TDC) positioning and the degrees of spark ignition before or after TDC to permit dynamic setting and monitoring of the engine ignition timing. The timing device uses a conventional inductive clamp to sense a spark and an optical sensor for sensing, the position of the engine. This patent further teaches the installation of additional components onto the motorcycle such that the optical sensor may provide a signal based upon camshaft position via the installed components. However, in order to accommodate the wide array of ignitions systems used on Harley-Davidson™ motorcycles, this patent employs various different hardware additions to be installed on the various different systems. Some portions of the hardware additions permanently remain on the motorcycle engine.

Thus, there is a continuing need for a simple, reliable ignition timing device for use on Harley-Davidson™ engines or other engines having a timing port in a crankcase. The improved ignition timing device should address one, some or all of the shortcomings discussed above.

SUMMARY OF THE INVENTION

An ignition timing device for timing an engine having a timing port includes a sensor securable in the timing port to provide a timing mark signal. An ignition sensor is adapted to provide an ignition signal. A comparator receives the timing mark signal and the ignition signal. The comparator provides an output signal indicative of substantial simultaneous occurrence of timing mark signal and the ignition signal. An indicator receives the output signal and is operable as a function thereof.

BRIEF DESCRIPTION OF THE DRAWINGS

FIG. 4 is a sectional view of a sensor having a plurality of variable the reluctance probes.

FIG. 5 is an end view of a sensor of FIG. 4.

FIG. 6 is an end view of a sensor having an elongated pole face.

DETAILED DESCRIPTION OF THE ILLUSTRATIVE EMBODIMENTS

Figure 1:
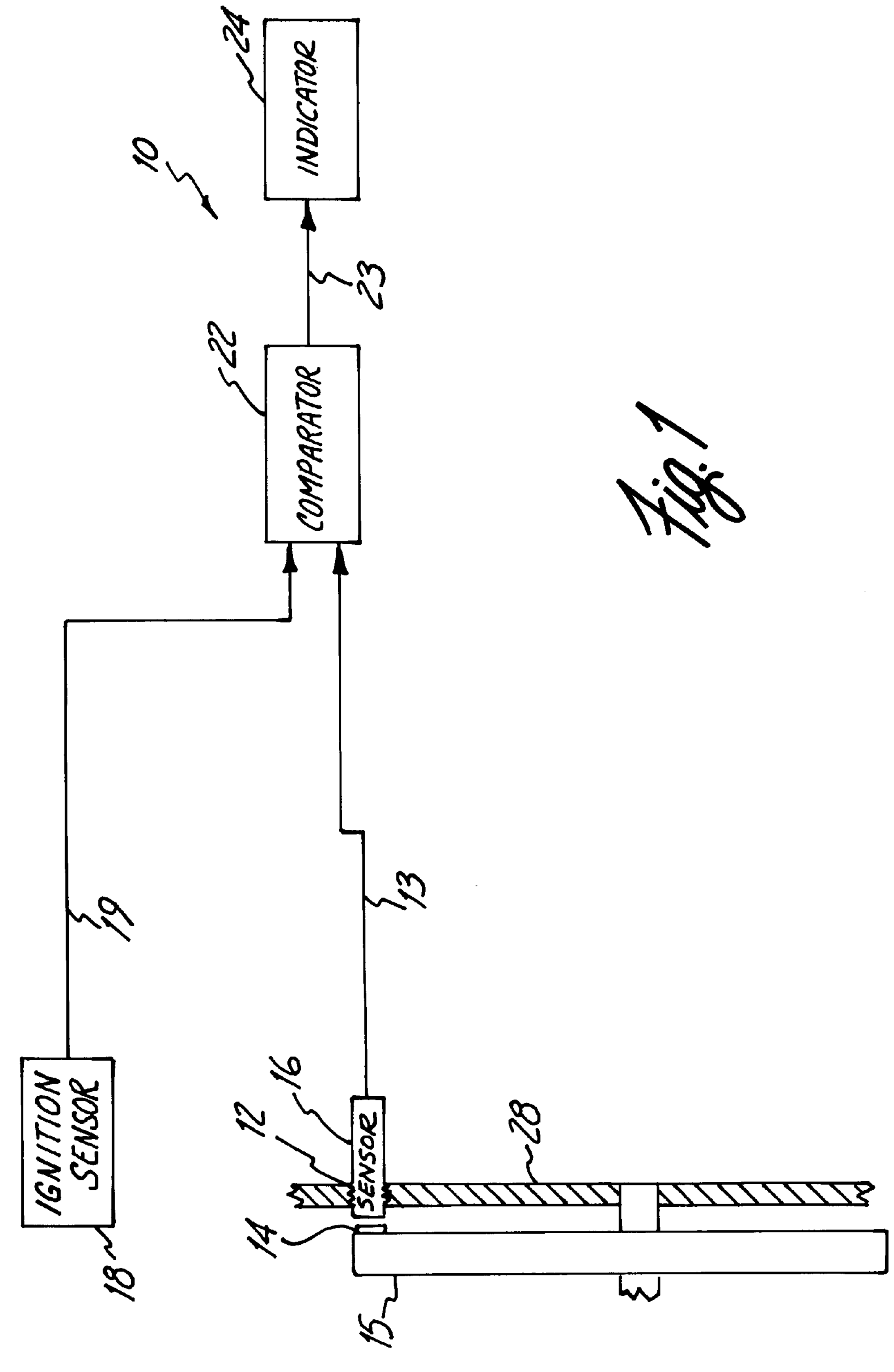
FIG. 1 is a schematic block diagram of an ignition timing device of the present invention.

FIG. 1 schematically illustrates an ignition timing device 10 for timing an engine such as the Harley-Davidson™ motorcycle engine, which has a timing port 12 through which a timing mark 14 can be seen on a rotating member or flywheel 15. Although the timing mark 14 illustrated herein is a projection, it should be understood that the timing mark 14 is commonly a depression, for example, a machined slot or void in the flywheel 15. A sensor 16 secured proximate the timing port 12 provides a timing mark signal 13 indicative of periodic presence of the timing mark 14 as the engine is operated. An ignition sensor 18 is adapted to provide an ignition signal 19 indicative of the occurrence of the ignition spark. A comparator 22 (e.g. an "AND" gate) receives the timing mark signal 13 and the ignition signal 19. The comparator 22 provides an output signal 23 indicative of substantial simultaneous occurrence of the timing mark signal 13 and the ignition signal 19.

An indicator 24 receives the output signal 23 and provides an indication to the operator when substantial simultaneous occurrence of the timing mark signal 13 and the ignition signal 19 have been realized. By using a sensor 16 that senses the periodic presence of the timing mark 14 rather than a timing light as is typically found in the prior art, the operator need not be confined to the side of the engine having the timing port 12 in order to see the timing mark 14 when illuminated by the timing light, but rather, can be located in any convenient position suitable for adjusting the ignition of the engine.

It should also be noted that the components or modules depicted in FIG. 1 and the figures discussed below are functional in that actual implementation can take the form of digital components, analog components, and/or software routines operable on a microcontroller, digital signal processor, or the like. Likewise, the signals appearing on each of the signal lines depicted in figures can be analog or digital with appropriate conversion elements, if necessary, as is well known in the art.

Various types of sensing means can be used for detecting the periodic presence of the timing mark 14 as it rotates on a flywheel 15 or other rotating member within the crank case housing 28. For instance, optical or infrared sensors, etc. can be used. Other suitable sensors include those that use a magnetic field, and thereby sense the presence of the timing mark by a change in magnetic field. Such sensors include Hall-effect, magneto-resistive, giant magneto-resistive and Eddy current.

Figure 2:
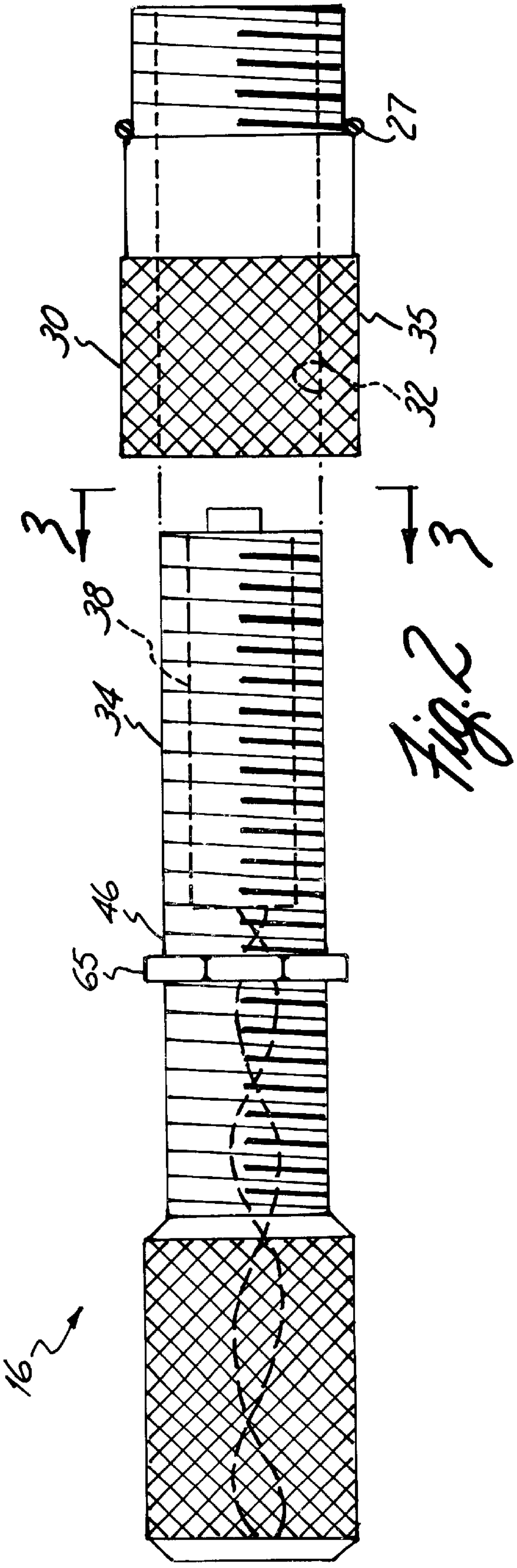
FIG. 2 is an elevational view of a variable reluctance sensor.
Figure 3:
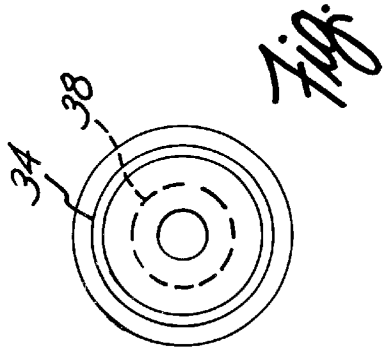
FIG. 3 is an end view of the variable reluctance sensor.

One particularly-useful sensor is a variable reluctance sensor, and in one preferred embodiment, the kind of which is illustrated in detail in FIGS. 2 and 3. The variable reluctance sensor 16, or any of the sensors discussed above, is preferably inserted into the port 12 so as to block the flow of oil mist which would otherwise emerge from the timing port 12 during timing of the engine. As illustrated in FIG. 2, the sensor 16 includes a support tube 30 that is insertable in the port 12. The support tube 30 includes a bore 32 extending from a first end to a second end. A sensor housing 34 is insertable in the bore 32. A sensing probe 38, such as a variable reluctance probe, is disposed in the sensor housing 34. The two-piece sensor assembly 16 is particularly convenient to use on Harley-Davidson™ motorcycle engines because of the wide variety of engine designs, wherein engine components proximate the timing port 12 can interfere with installation of a sensor with an outside diameter equal to the timing port 12.

In one embodiment, the support tube 30 includes exterior threads 42 that mate with threads formed about the timing port 12 on the crankcase. An O-ring 27 or other seal can further be provided on the support tube 30 to form a seal about the timing port 12 and prevent discharge of oil therefrom. A knurled grip 35 or other suitable features can be incorporated on the support tube 30 so as to allow ease of turning in order to mate the threads 42 with the threads of the port 12. In a further embodiment, the sensor housing 34 includes exterior threads 46 adapted to mate with interior threads (not shown) provided in bore 32 of the support tube 30.

As discussed above, the sensing probe 38 is disposed and secured in the sensor housing 34. One suitable variable reluctance probe is available from Electro Corporation of Sarasota, Fla., as Part No. 302662, although other probes could be used. The sensing probe 38 is mounted in the sensor housing 34 by suitable means such as the use of potting material. In the embodiment illustrated in FIGS. 2 and 3, one sensing probe 38 is used. However, as illustrated in FIGS. 4 and 5, multiple sensing probes 60 can be disposed within the sensor housing 34 wherein the pole faces of the sensor probes 60 are generally aligned or otherwise arranged in correspondence with the timing mark 14. For example, in Harley-Davidson™ motorcycle engines, a convenient timing mark 14 to use comprises an elongated mark present on most engines. Therefore, in this embodiment, the individual pole faces of the sensing probes 60 would be generally aligned in a straight line. FIG. 6 illustrates another embodiment wherein a pole face 62 includes an elongated portion that corresponds generally to the elongated timing mark 14. The pole face 62 can be used with single or multiple sensor probes.

In operation to properly position the pole face of the sensing probe 38 or probes 60, the support tube 30 is first inserted into the timing port 12 with the engine turned off. The sensor housing 34 is then inserted into and through the bore 32 until the pole face contacts the rotating member 15. At that point, the pole sensor housing 34 and face are backed away from the rotating member 15 (e.g. approximately 0.0125 inches). In the embodiment illustrated, this includes threaded rotation of the sensor housing 34 relative to the support tube 30 to avoid contact with the rotating member 15 yet maintain close proximity of the pole face to the timing mark 14. A locking nut 65 (FIG. 2) locks the sensor housing 34 into position. As appreciated by those skilled in the art, other forms of mechanical couplings can be used between the support tube 30 and the sensor housing 34 instead of interlocking threads. For instance, a setscrew can be used. Likewise, frictions seals or plates can be used. With the sensor 16 in position to block the flow of oil, the user can then run the engine during the time procedure without oil mist emerging from the timing port 12.

Referring back to FIG. 1, the ignition sensor 18 can take many forms. In one embodiment, the ignition sensor 18 is an inductive clamp. An inductive clamp, as is well known in the art, senses the high voltage secondary current provided to a spark plug. Alternatively, the ignition sensor 18 can be directly, electrically connected to the spark plug wire and receive a portion of the secondary current. Suitable circuitry would be provided to isolate other components of the ignition timing device 10 from high energy ignition current. In yet a further embodiment, the ignition sensor 18 can be operably connected to a primary circuit of an ignition coil.

Figure 7:
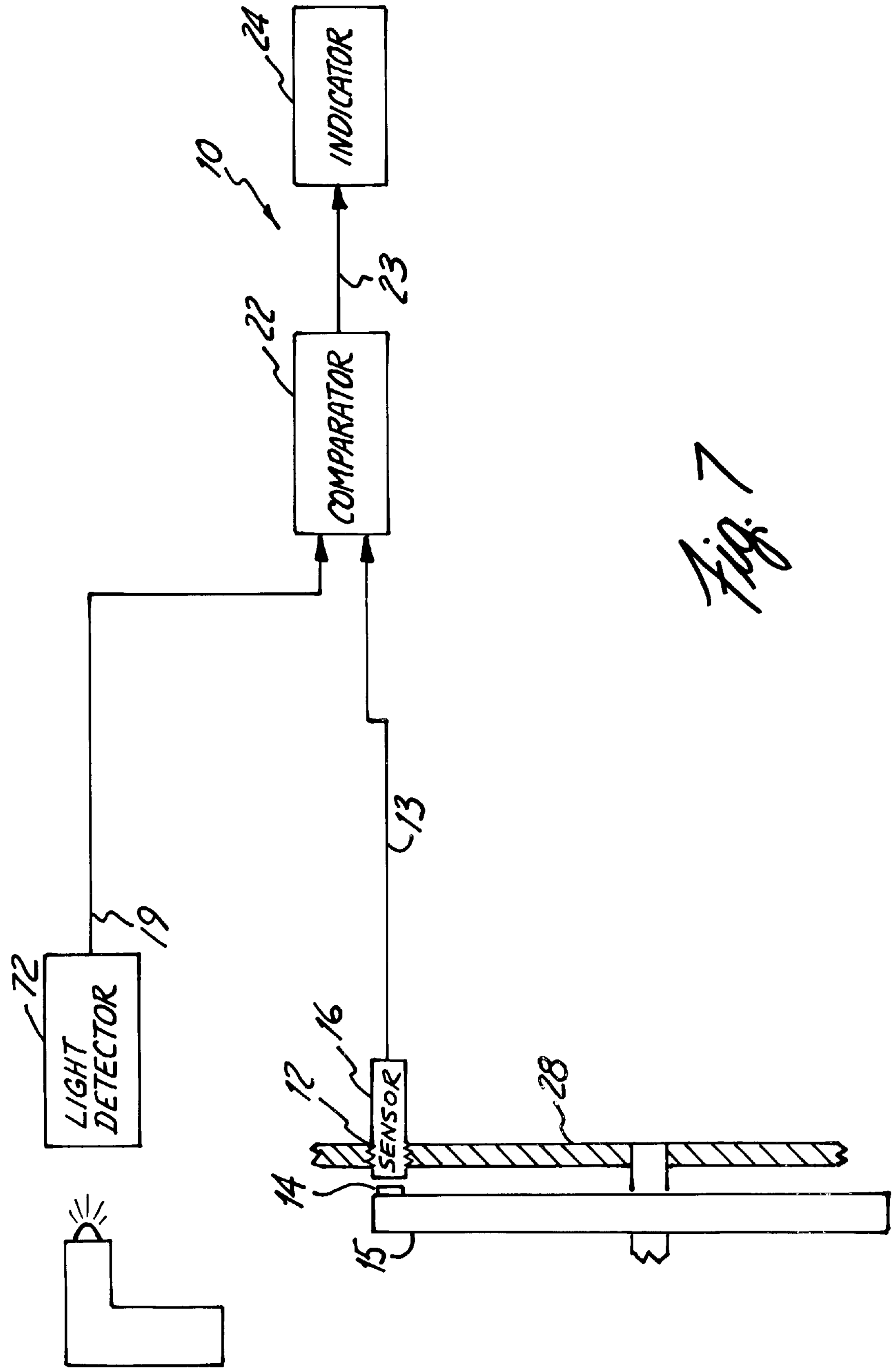
FIG. 7 is a block diagram of a second embodiment of the ignition timing device.

FIG. 7 illustrates yet a further embodiment where the ignition sensor 18 comprises a timing light 70 and a light detector 72. The timing light 70 is conventionally connected to one of the spark plug wires to sense current flow therein. The timing light 70 produces a strobed light corresponding to the ignition current provided to the associated spark plug. The light detector 72 senses the strobed light and provides the ignition signal 19 indicative of the occurrence of the ignition spark.

The advantage of using the timing device 10 over a traditional timing light is that it allows one person to easily time the engine. This is particularly true for a Harley-Davidson™ motor. As is well known, the timing port 12 is located on one side of the Harley-Davidson motor, while the ignition components used for adjustment are located on the other side. If two persons are present, one will hold and view the timing light while the other makes the necessary adjustments. Of course, one person can also time the engine, but that person must move from side to side alternating viewing of the timing mark with making minor adjustments.

The timing device 10 eliminates the need for two people, or alternately moving from side to side. With the circuit components disposed in a suitable housing and signal leads extending to the sensor 16 and the ignition sensor 18, the user can be positioned on the side of the motorcycle having the ignition components. The indicator 24 indicates when the desired ignition timing has been achieved. In addition, the sensor 16 is not affected by oil splash and requires no modifications to the stock Harley-Davidson™ flywheel 15. Moreover, the sensor 16 is fixed and is consistently located in the same position (e.g. centered) in the timing port 12, which enables accurate ignition timing.

On most pre-Evolution™ motors, the top dead center mark is a dot depression and the full advance mark is an elongated depression or slot. In contrast, on Harley-Davidson™ Evolution™ motors, the top dead center (TDC) mark is an elongated slot and the full advance mark is a dot depression. Balance holes and other marks can be seen on the surface of the flywheel 15 at various locations. The sensor 16 may detect any or all of these marks on the flywheel 15. In one mode of operation, the elongated slot is used since it is typically the most consistent in size and location on the flywheel 15. However, as appreciated by those skilled in the art, other timing marks can be provided on the flywheel 15 and sensed by the sensor 16.

If the elongated slot is used on pre-Evolution™ motors for timing, the timing device 10 illustrated in FIG. 1 can be used since the elongated slot represents full advance. Comparator 22 compares the ignition signal 19 with the timing mark signal 13 from sensor 16. If the timing mark signal 13 is substantially simultaneous with the ignition signal 19, the comparator 22 provides an output signal to a suitable indicator 24, such as a light emitting diode (LED).

Figure 8:
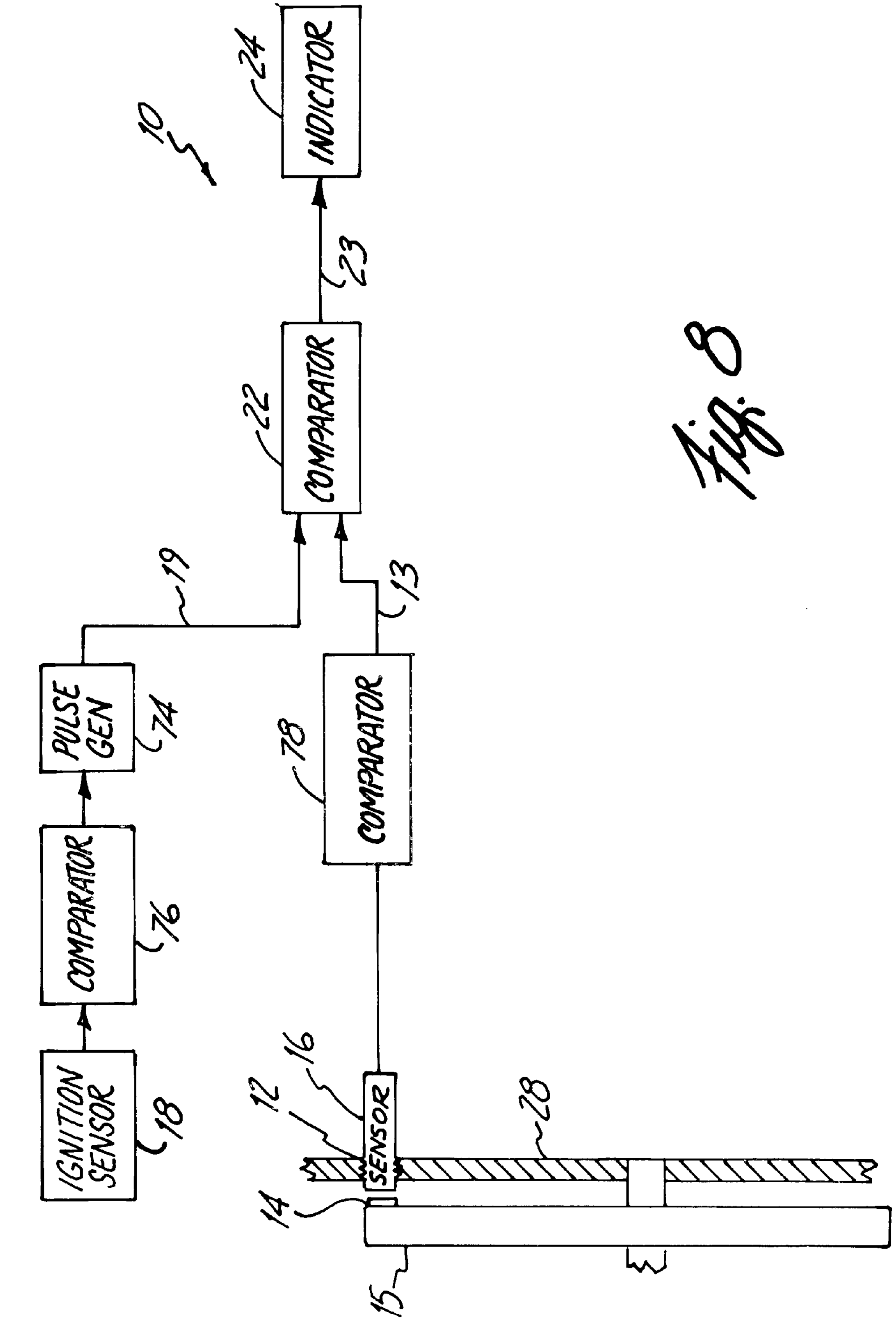
FIG. 8 is a block diagram of a third embodiment of the ignition timing device.

In a further embodiment illustrated in FIG. 8, the timing device 10 includes a pulse generator 74, which generates a pulse of selected width to be used as the ignition signal 19. A comparator 76 can receive the output from the ignition sensor 18 and initiate the pulse generator 74, when the output from the ignition sensor 18 exceeds a selected threshold. Similarly, a comparator 78 can monitor the output of the sensor 16 and provide the timing signal 13 if the output has exceeded a selected threshold. The pulse generator 74, in effect, sets the tolerance band for "substantially simultaneous" occurrence of the ignition signal 19 and the timing signal 13. For pre-Evolution™ engines, the ignitions generally include "points" and a pulse width corresponding to a three degree window at 2500 rpm (a common engine speed used for timing), or approximately 200 microseconds is sufficient. Of course, other pulse widths corresponding to other timing windows can be used and, if desired, the timing window can be adjustable.

Figure 9:
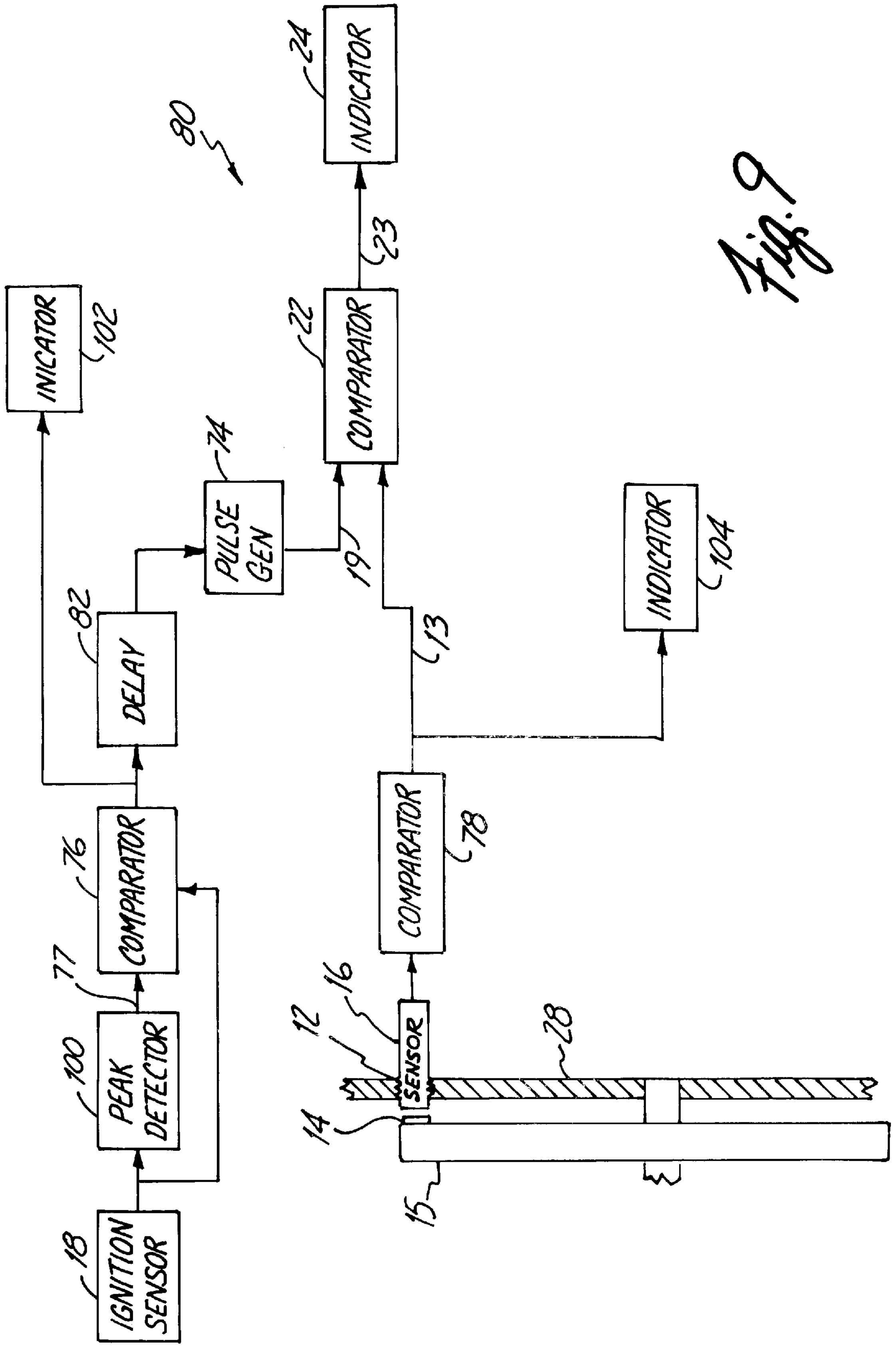
FIG. 9 is a block diagram of a fourth embodiment of the ignition timing device.

If the elongated slot is used on Evolutions™ motors for timing, a timing device 80 illustrated in FIG. 9 can be used. The timing device 80 is similar to the timing device 10, but also includes a delay element 82. Delay element 82 generates a delay proportional to a selected setting and the engine speed. In one embodiment, an adjuster (e.g. calibrated degree dial) is provided so as to allow the user to adjust the amount of time delay upon the occurrence of each secondary pulse. It should be noted time delay corresponds to the number of degrees of crankshaft rotation. This allows the user to determine precisely when the selected cylinder is firing with respect to the timing mark 14. The purpose of delay element 82 is to delay the occurrence of the ignition signal 19 for purposes of comparison with the signal from sensor 16 at comparator 22. The delay element 82 can take many forms. In one embodiment, the delay element 82 comprises a pulse width modulation circuit, wherein the leading edge corresponds to the occurrence of the ignition signal 19 and the trailing edge follows the leading edge by the selected delay and comprises the delayed ignition signal 21.

Upon the occurrence of the trailing edge, a short pulse (approximately 66 microseconds, which corresponds to one degree of rotation at 2500 rpm) is generated by the pulse generator 74. The short pulse comprises the delayed ignition signal 19 and is used by comparator 22 for comparison with the timing signal 13. It should be noted that the timing device 80 can be used on pre-Evolution™ engines if the delay element 82 is set to zero (i.e. no delay) and the pulse generator 74 is adjusted to provide a longer pulse (i.e. timing window) As appreciated by those skilled in the art, the delay element 82 could be used to delay the timing mark signal 13 depending on the location of the timing mark 14 relative to the desired ignition setting.

FIG. 9 also illustrates other circuit components that may be included in the ignition timing device 80. In the embodiment of FIG. 9, ignition timing device 80 includes the comparators 76 and 78 as discussed above. The comparators 76 and 78 reduce errant signals from reaching the comparator circuit 22.

In yet a further embodiment, ignition timing device 80 includes a peak detector circuit 100 that detects when the engine ignition has fired a "live" cylinder (i.e. a cylinder having combustion gasses rather than exhaust gasses). As is well known, some Harley-Davidson™ motorcycles incorporate a dual fire ignition wherein one of the cylinders is on a compression stroke and the other is on the exhaust stroke at each ignition spark. It has been found that a "live" cylinder requires a higher secondary voltage for current to jump the plug gap.

The peak detector circuit 100 filters the output signal from the ignition sensor 18 (e.g. an inductive clamp sensing the secondary current) and provides as an output, a signal indicative of only the ignition sparks used during detonation on the compression strokes. In the embodiment illustrated, the peak detector circuit 100 senses the peak amplitude of the output of the ignition sensor 18, which is provided to the comparator 76 at signal line 77. The threshold of the comparator 76 is set to a level that discriminates the signals associated with sparks during the compression strokes from the sparks associated with the exhaust strokes. In one embodiment, the threshold is about 80% of the output signal from the peak detector circuit 100. The comparator 76 also receives the output signal from the ignition sensor 18. Thus, when the comparator 76 senses that the output signal from the ignition sensor 18 exceeds 80% of its peak, an output is provided to the delay element 82 and used for ignition timing purposes. The peak detector circuit 100 may be replaced by a constant threshold voltage and the circuit may still detect spark occurring in a compression stroke versus an exhaust stroke. However, the peak detector circuit 100 is particularly advantageous in that it follows the amplitude output signal from the ignition sensor 18, which may vary between different ignition systems.

Indicators 102 and 104 are provided to indicate portions of the ignition timing device 80 are operating properly. Indicator 102 indicates that the ignition sensor i8 is working properly. In the embodiment illustrated, Indicator 102 receives a drive signal from comparator 76. Similarly, indicator 104 indicates that sensor 16 is functioning properly. Indicator 104 can be driven by the output signal from the comparator 78. If desired, a tachometer can be included and, for example, incorporated in the indicator 102. As appreciated by those skilled in the art, drive signals for the indicators 102 and 104 can be obtained at other locations in the timing device 80.

Figure 10:
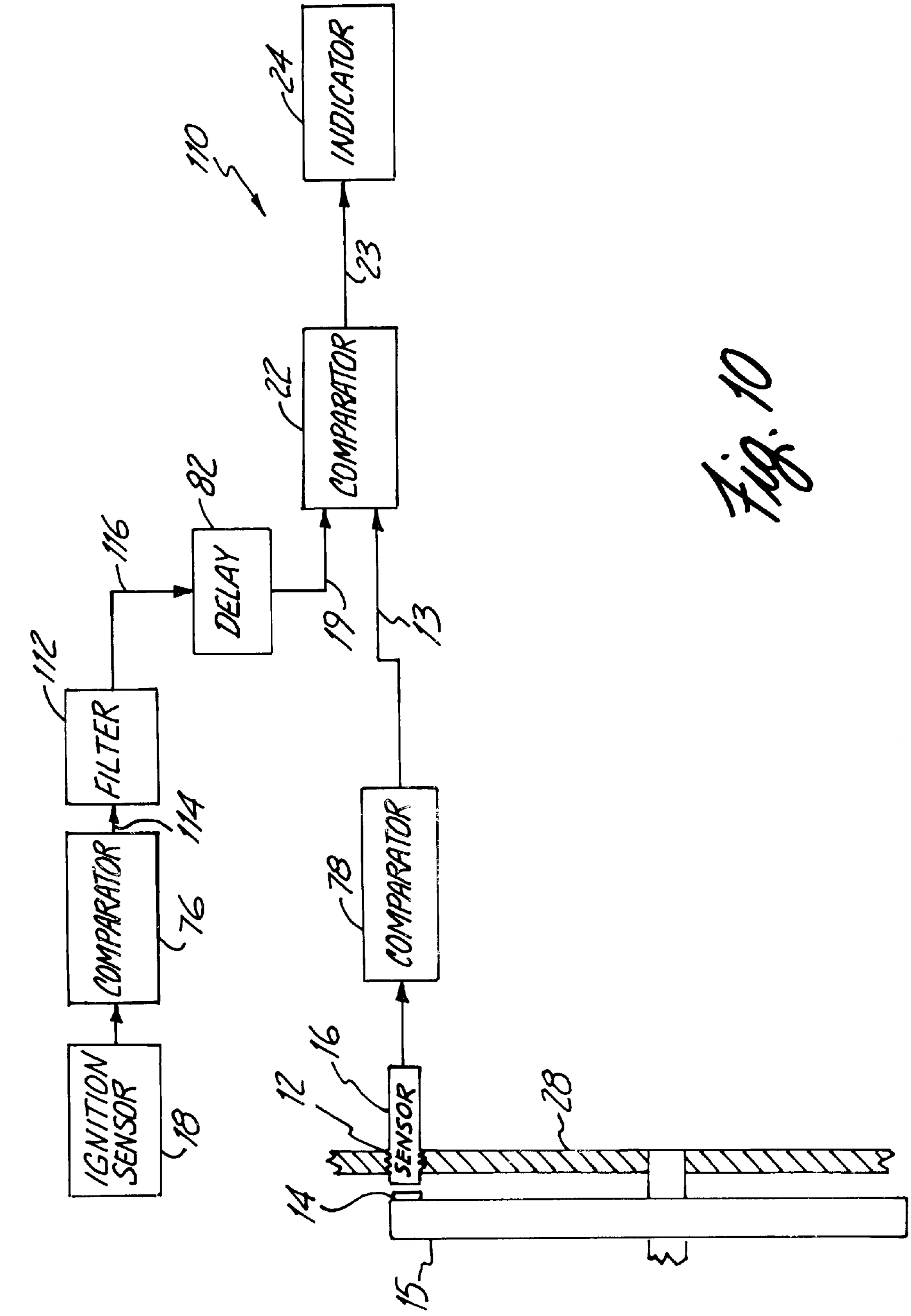
FIG. 10 is a block diagram of a fifth embodiment of the ignition timing device.

FIG. 10 illustrates another timing device 110 that can be used on dual-fire ignition systems to discriminate or filter the ignition signal 19 so as to provide only a signal indicative of detonation sparks during the compression strokes of a selected cylinder. In this embodiment, a filter 112 receives the output from the comparator 76 at 114. The filter 112 filters out only the detonation sparks of a selected cylinder, providing a signal 116 indicative thereof to the delay element 82.

Figure 11:
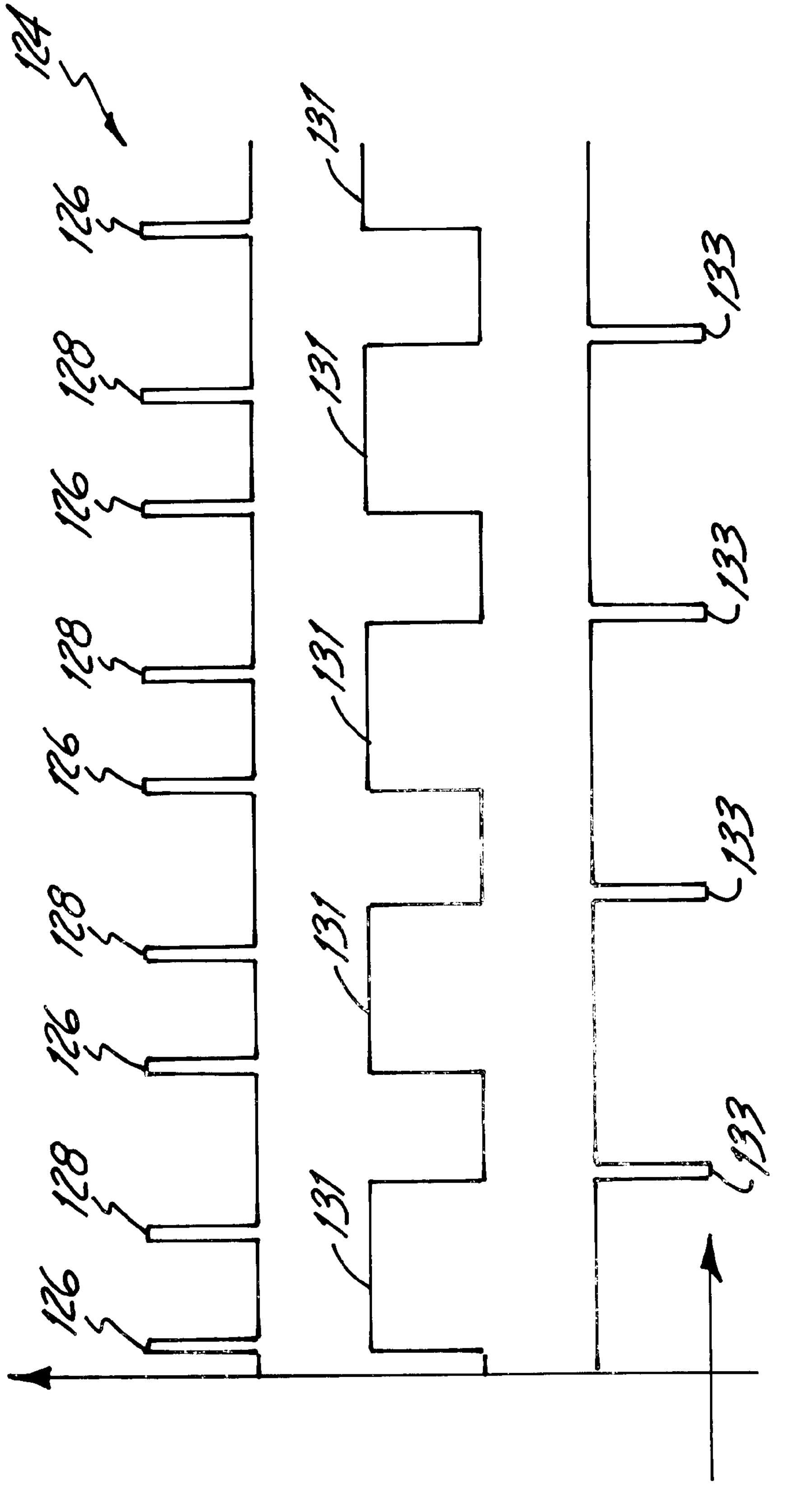
FIG. 11 is a timing diagram.

FIG. 11 is a timing diagram illustrating at 124 an exemplary representation of the signal 114. Sparks associated with detonation of the front cylinder of a Harley-Davidson™ engine are indicated at 126, while sparks associated with detonation of the rear cylinder are indicated at 128. As well known in the art, detonation of the rear cylinder follows the front cylinder by approximately 315°, while detonation of the front cylinder follows the rear cylinder by approximately 405°.

Figure 12:
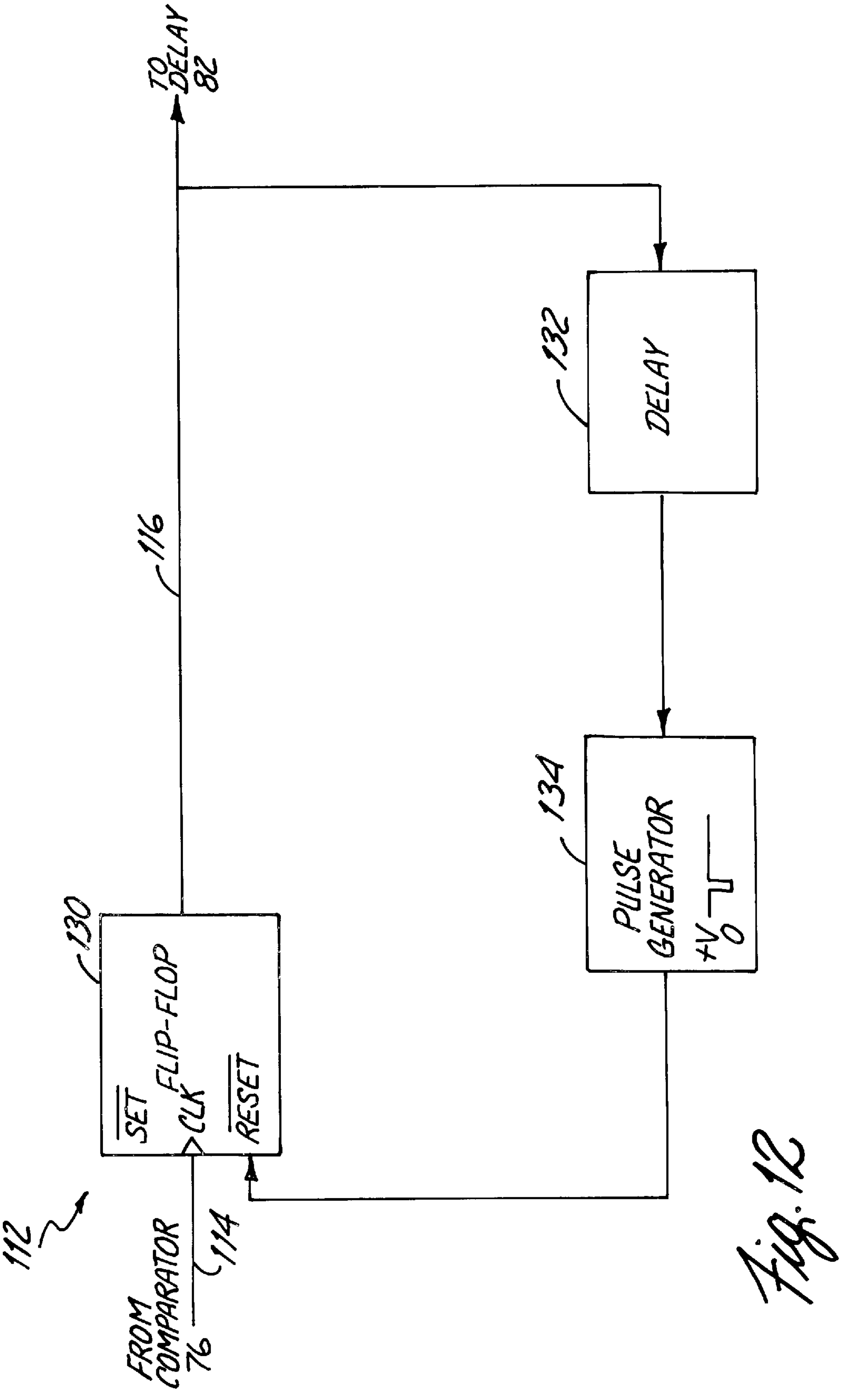
FIG. 12 is a circuit diagram of a filtering circuit.

FIG. 12 illustrates an exemplary circuit for filter 112 to discriminate between sparks associated with detonation of a front cylinder and sparks associated with detonation of the rear cylinder. As illustrated, the circuit 112 includes a flip-flop 130, a delay element 132 and a pulse generator 134. Signal 114 from the comparator 76 is provided to the "clock" input of the flip-flop 130. The output of the flip-flop 130 is provided to the delay element 82 and the delay element 132 on signal line 116. The flip-flop 130 is configured so as to initiate the delay element 132 upon the occurrence of a pulse 126 indicative of detonation of the front cylinder. As illustrated in FIG. 11, the delay element 132 can comprise a pulse-width modulation circuit that provides a delay 131 sufficient to extend past the subsequent pulse 128 corresponding to detonation of the rear cylinder. For example, a delay equivalent to 340° is sufficient. At the trailing edge of the 340° delay, a pulse 133 is generated by the pulse generator 134 to "reset" the flip-flop 130, which thereby ensures that the output of the flip-flop 130 at signal line 116 will go high only when the front cylinder detonates. If it is desirable to obtain the timing reference off the rear cylinder, the output from the pulse generator 134 can be provided to the "set" input of the flip-flop 130. The output 116 will then go high only when the rear cylinder detonates. As appreciated by those skilled in the art, other circuits and methods can be used to filter the signal 114 to provide a signal indicative of detonation of a selected cylinder. For instance, a reference clock pulse of a given frequency can be generated. The number of pulses between each of the cylinder firings can be counted. Since the time between front and rear cylinder firing is unequal, the number of clock pulses will be unequal, thus the circuit can determine which cylinder is firing at any given time. The circuit can be built using hardware such as, discrete digital logic. Likewise, software routines operable on a microcontroller or a digital signal processor can be used to perform filtering.

Although the present invention has been described with reference to preferred embodiments, workers skilled in the art will recognize that changes may be made in form and detail without departing from the spirit and scope of the invention.

What is claimed is:

1. A method for timing a Harley Davidson type engine having a timing port through which a timing mark indicative of a position of a movable member of the engine can be seen, the method comprising:

securing a variable reluctance sensor proximate the timing port of the Harley Davidson type engine;

sensing the presence of the timing mark of the engine with the variable reluctance sensor and providing a timing mark signal as a function thereof;

sensing an occurrence of an ignition spark and providing an ignition signal as a function thereof;

filtering ignition sparks of compression strokes from ignition sparks of compression and exhaust strokes of a selected cylinder and providing a filtered ignition signal being indicative of only the ignition sparks of compression strokes;

generating a delayed signal having a selected delay from the filtered ignition signal;

comparing the timing mark signal to the delayed signal and providing an output signal indicative of substantial simultaneous occurrence of the timing mark signal and the delayed signal; and operating an indicator as a function of the output signal.

2. The method of claim 1, wherein filtering comprises comparing the ignition signal with a selected threshold.

3. The method of claim 1 wherein filtering comprises:

detecting a peak amplitude of the ignition signal; and forming the selected threshold as a function of the ignition signal from at least one previous spark.

4. A combination comprising:

a Harley Davidson type engine having a timing port and a timing mark indicative of a position of a movable member, wherein the Harley Davidson type engine provides ignition sparks for compression strokes and exhaust strokes to a selected cylinder;

an ignition timing device including:

a variable reluctance sensor secured in the timing port to provide a timing mark signal indicative of presence of the timing mark;

an ignition sensor adapted to provide an ignition signal indicative of the occurrence of an ignition spark;

a filter receiving the ignition signal and to provide a filtered ignition signal, the filter filtering ignition sparks of compression strokes from ignition sparks of compression and exhaust strokes of the selected cylinder;

a delay element receiving the filtered ignition a selected delay from the filtered ignition signal;

a comparator receiving the timing mark signal and the delayed signal, the comparator providing an output signal indicative of substantial simultaneous occurrence of the timing mark signal and the delayed signal; and an indicator receiving the output signal and operable as a function thereof.

5. The combination of claim 4 wherein the variable reluctance sensor comprises;

a support tube insertable in the port and having a bore extending from a first end to a second end;

a sensor housing insertable in the bore; and a variable reluctance probe disposed in the sensor housing.

6. The combination of claim 5 wherein the support tube includes exterior threads adapted to mate with threads of the port.

7. The combination of claim 6 wherein the support tube includes interior threads and the sensor housing includes exterior threads adapted to mate with the interior threads.

8. The combination of claim 1 wherein the filter includes a comparator, wherein the filtered ignition signal is indicative of a spark exceeding a selected threshold.

9. The combination of claim 8 wherein the selected threshold is constant.

10. The combination of claim 8 and further comprising a peak detector, and wherein the selected threshold is a function of at least one previous detected spark.

11. The combination of claim 4 wherein the ignition sensor comprises a light detector.

* * * * *